United States Patent
Gkellas et al.

(10) Patent No.: US 12,219,399 B2
(45) Date of Patent: Feb. 4, 2025

(54) MULTIPLE USER PLANE FUNCTION SUPPORTING ACCESS TRAFFIC STEERING, SWITCHING, AND SPLITTING FOR MULTI-ACCESS PACKET DATA UNIT SESSION

(71) Applicant: NOKIA TECHNOLOGIES OY, Espoo (FI)

(72) Inventors: Georgios Gkellas, Petroupoli (GR); Rainer Liebhart, Munich (DE); Mu He, Munich (DE); Devaki Chandramouli, Plano, TX (US); Laurent Thiebaut, Antony (FR); Lazaros Gkatzikis, Issy-les-Moulineaux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 177 days.

(21) Appl. No.: 17/588,966

(22) Filed: Jan. 31, 2022

(65) Prior Publication Data
US 2023/0247487 A1    Aug. 3, 2023

(51) Int. Cl.
*H04W 28/12*   (2009.01)
*H04W 28/02*   (2009.01)
(Continued)

(52) U.S. Cl.
CPC ....... *H04W 28/12* (2013.01); *H04W 28/0236* (2013.01); *H04W 40/12* (2013.01); *H04W 76/10* (2018.02)

(58) Field of Classification Search
CPC ................. H04W 28/12; H04W 76/10; H04W 28/0236; H04W 40/12
See application file for complete search history.

(56) References Cited

U.S. PATENT DOCUMENTS 9,912,553 B1 *   3/2018   Grebenschikov ....... H04L 67/10
2019/0261260 A1 *   8/2019   Dao ...................... H04W 48/00
(Continued)

OTHER PUBLICATIONS

3GPP TSG SA WG2 Meeting #145E (e-meeting), May 17-28, 2021, Elbonia, S2-2104582,"Discussion on ATSSS Enhancements", Lenovo, Motorola Mobility, 10 pages.
(Continued)

*Primary Examiner* — Ajay Cattungal
(74) *Attorney, Agent, or Firm* — SQUIRE PATTON BOGGS (US) LLP

(57) ABSTRACT

Systems, methods, apparatuses, and computer program products for access traffic steering, switching, and splitting (ATSSS) with branching point (BP) on the path are provided. The method may include determining that an existing user plane function is sub-optimal in terms of routing and latency incurred with respect to traffic for a given packet data unit session of a user equipment. The method may also include establishing, based on the determination, a new user plane function for the packet data unit session. The method may further include establishing a branching point user plane function that interfaces with the existing user plane function, the new user plane function, and a plurality of network access types. In addition, the method may include updating the user equipment by providing the user equipment with relevant multi-access traffic steering rules.

23 Claims, 5 Drawing Sheets

(51) Int. Cl.
  *H04W 40/12*     (2009.01)
  *H04W 76/10*     (2018.01)

(56)           References Cited

U.S. PATENT DOCUMENTS

2020/0329008 A1* 10/2020 Dao .................... H04L 61/5007
2021/0099943 A1*  4/2021 Dannebro ......... H04W 36/0011
2021/0127271 A1*  4/2021 Wu .................... H04W 12/0471
2021/0410010 A1* 12/2021 Salkintzis ............. H04W 76/15
2022/0124065 A1*  4/2022 Dao .................... H04L 61/5007
2022/0191165 A1*  6/2022 Zhu .................... H04L 61/4511
2022/0386228 A1* 12/2022 Dao .................. H04W 36/0009

OTHER PUBLICATIONS

Extended European Search Report dated May 2, 2023, corresponding to European Patent Application No. 23152599.9.

* cited by examiner

MULTIPLE USER PLANE FUNCTION SUPPORTING ACCESS TRAFFIC STEERING, SWITCHING, AND SPLITTING FOR MULTI-ACCESS PACKET DATA UNIT SESSION

FIELD

Some example embodiments may generally relate to mobile or wireless telecommunication systems, such as Long Term Evolution (LTE) or fifth generation (5G) new radio (NR) access technology or sixth generation (6G), or other communications systems. For example, certain example embodiments may relate to apparatuses, systems, and/or methods for multiple user plane function (UPF) supporting access traffic steering, switching, and splitting (ATSSS) for a multi-access packet data unit (MA PDU) session.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G network can also build on E-UTRAN radio. It is estimated that NR will provide bitrates on the order of 10-20 Gbit/s or higher and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include determining that an existing user plane function is sub-optimal in terms of routing and latency incurred with respect to traffic for a given packet data unit session of a user equipment. The method may also include establishing, based on the determination, a new user plane function for the packet data unit session. The method may further include establishing a branching point user plane function that interfaces with the existing user plane function, the new user plane function, and a plurality of network access types. In addition, the method may include updating the user equipment by providing the user equipment with relevant multi-access traffic steering rules.

Other example embodiments may be directed to an apparatus. The apparatus may include at least one processor and at least one memory including computer program code. The at least one memory and computer program code may also be configured to, with the at least one processor, cause the apparatus at least to determine that an existing user plane function is sub-optimal in terms of routing and latency incurred with respect to traffic for a given packet data unit session of a user equipment. The apparatus may also be caused to establish, based on the determination, a new user plane function for the packet data unit session. The apparatus may further be caused to establish a branching point user plane function that interfaces with the existing user plane function, the new user plane function, and a plurality of network access types. In addition, the apparatus may be caused to update the user equipment by providing the user equipment with relevant multi-access traffic steering rules.

Other example embodiments may be directed to an apparatus. The apparatus may include means for determining that an existing user plane function is sub-optimal in terms of routing and latency incurred with respect to traffic for a given packet data unit session of a user equipment. The apparatus may also include means for establishing, based on the determination, a new user plane function for the packet data unit session. The apparatus may further include means for establishing a branching point user plane function that interfaces with the existing user plane function, the new user plane function, and a plurality of network access types. In addition, the apparatus may include means for updating the user equipment by providing the user equipment with relevant multi-access traffic steering rules.

In accordance with other example embodiments, a non-transitory computer readable medium may be encoded with instructions that may, when executed in hardware, perform a method. The method may include determining that an existing user plane function is sub-optimal in terms of routing and latency incurred with respect to traffic for a given packet data unit session of a user equipment. The method may also include establishing, based on the determination, a new user plane function for the packet data unit session. The method may further include establishing a branching point user plane function that interfaces with the existing user plane function, the new user plane function, and a plurality of network access types. In addition, the method may include updating the user equipment by providing the user equipment with relevant multi-access traffic steering rules.

Other example embodiments may be directed to a computer program product that performs a method. The method may include determining that an existing user plane function is sub-optimal in terms of routing and latency incurred with respect to traffic for a given packet data unit session of a user equipment. The method may also include establishing, based on the determination, a new user plane function for the packet data unit session. The method may further include establishing a branching point user plane function that interfaces with the existing user plane function, the new user plane function, and a plurality of network access types. In addition, the method may include updating the user equipment by providing the user equipment with relevant multi-access traffic steering rules.

Other example embodiments may be directed to an apparatus that may include circuitry configured to determine that an existing user plane function is sub-optimal in terms of routing and latency incurred with respect to traffic for a given packet data unit session of a user equipment. The apparatus may also include circuitry configured to establish, based on the determination, a new user plane function for the packet data unit session. The apparatus may further include circuitry configured to establish a branching point user plane function that interfaces with the existing user plane function, the new user plane function, and a plurality of network access types. In addition, the apparatus may include circuitry configured to update the user equipment by providing the user equipment with relevant multi-access traffic steering rules.

Some example embodiments may be directed to a method. The method may include establishing a packet data unit session with a user plane function. The method may also include transmitting location information to a network element triggering establishment of a new user plane function. The method may further include receiving, from the network element, an update comprising relevant multi-access traffic steering rules. In addition, the method may include establishing communication with new user plane function based on the relevant multi-access traffic steering rules.

Other example embodiments may be directed to an apparatus. The apparatus may include at least one processor and at least one memory including computer program code. The at least one memory and computer program code may also be configured to, with the at least one processor, cause the apparatus at least to establish a packet data unit session with a user plane function. The apparatus may also be caused to transmit location information to a network element triggering establishment of a new user plane function. The apparatus may further be caused to receive, from the network element, an update comprising relevant multi-access traffic steering rules. In addition, the apparatus may be caused to establish communication with new user plane function based on the relevant multi-access traffic steering rules.

Other example embodiments may be directed to an apparatus. The apparatus may include means for establishing a packet data unit session with a user plane function. The apparatus may also include means for transmitting location information to a network element triggering establishment of a new user plane function. The apparatus may further include means for receiving, from the network element, an update comprising relevant multi-access traffic steering rules. In addition, the apparatus may include means for establishing communication with new user plane function based on the relevant multi-access traffic steering rules.

In accordance with other example embodiments, a non-transitory computer readable medium may be encoded with instructions that may, when executed in hardware, perform a method. The method may include establishing a packet data unit session with a user plane function. The method may also include transmitting location information to a network element triggering establishment of a new user plane function. The method may further include receiving, from the network element, an update comprising relevant multi-access traffic steering rules. In addition, the method may include establishing communication with new user plane function based on the relevant multi-access traffic steering rules.

Other example embodiments may be directed to a computer program product that performs a method. The method may include establishing a packet data unit session with a user plane function. The method may also include transmitting location information to a network element triggering establishment of a new user plane function. The method may further include receiving, from the network element, an update comprising relevant multi-access traffic steering rules. In addition, the method may include establishing communication with new user plane function based on the relevant multi-access traffic steering rules.

Other example embodiments may be directed to an apparatus that may include circuitry configured to establish a packet data unit session with a user plane function. The apparatus may also include circuitry configured to transmit location information to a network element triggering establishment of a new user plane function. The apparatus may further include circuitry configured to receive, from the network element, an update comprising relevant multi-access traffic steering rules. In addition, the apparatus may include circuitry configured to establish communication with new user plane function based on the relevant multi-access traffic steering rules.

BRIEF DESCRIPTION OF THE DRAWINGS

For proper understanding of example embodiments, reference should be made to the accompanying drawings, wherein.

DETAILED DESCRIPTION

Figure 1:
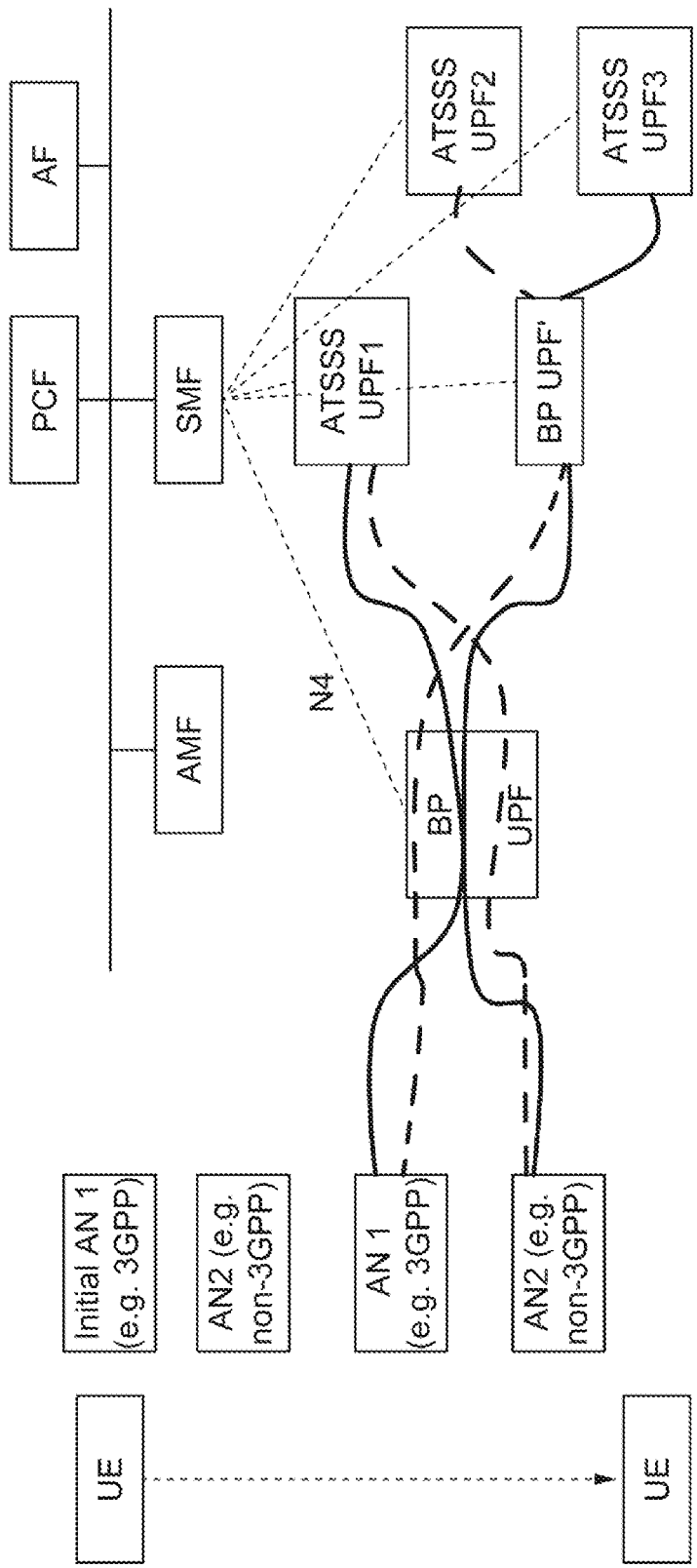
FIG. 1 illustrates an example multi-homed multi-access packet data unit (MA PDU) session, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for multiple UPFs supporting ATSSS for one MA PDU session.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

3rd Generation Partnership Project (3GPP) describes ATSSS as allowing traffic steering across multiple accesses (e.g., one 3GPP and one non-3GPP access) on a service data flow level (i.e., at finer granularity than a PDU session). In ATSSS, the notion of MA PDU sessions is introduced. This may include, for example, PDU sessions for which data traffic can be sent over one or more (e.g., two) concurrent accesses.

In some cases, the actual traffic steering in both user equipment (UE) and user plane function (UPF) may be performed by steering functions. For instance, 3GPP defines two types of steering functions. First, 3GPP defines a lower layer function may be provided known as ATSSS-LL. Second, 3GPP defines a multipath transmission control protocol (MPTCP) where the UPF implements an MPTCP proxy. Other types of steering functions may be defined in the future (e.g. based on QUIC/MPQUIC).

Based on policy and charging control (PCC) rules provided by the policy control function (PCF), the session management function (SMF) may create ATSSS rules and multi-access rules (MAR). A single UPF may be used as a termination point of both access legs (i.e., terminates the MA PDU session). Additionally, ATSSS rules may be sent by the SMF to the UE via a non-access stratum (NAS), whereas MA rules may be sent to the UPF via an N4 interface. ATSSS rules includes traffic descriptors and information about steering modes and steering functions to be applied by the UE for UL traffic. MA rules may include necessary information for the UPF to perform traffic steering such as applicable steering modes and steering functions, and forwarding action information for each of the two accesses for DL traffic. Roundtrip time (RTT) measurements and reporting of access (un)availability may be performed by a performance measurement functionality (PMF) in the UE and UPF, or by using the corresponding function provided by the MPTCP (or other steering functions like QUIC/MPQUIC based in the future).

Currently, MA PDU sessions do not allow a BP or ULCL in the traffic path. The current ATSSS architecture assumes a single UPF for a MA PDU session supporting the ATSSS functionality, interfacing via N6 with a data network (DN). Additionally, support of multiple N6 interfaces (e.g., to a central and an edge data center or two edge data centers) is currently not possible for MA PDU sessions. This implies that certain use cases cannot be fulfilled in the context of an existing MA PDU session to maintain a user equipment's (UE's) service continuity. For instance, in one case, the N6 interfacing UPF may be changed to another UPF that is better able to handle (e.g., with lower latency) UP traffic as it is closer to the (moving) UE using latency sensitive applications (e.g., applications that require low latency). In another case, the N6 interfacing UPF may be changed to another UPF that is better able to handle (e.g., with lower latency) UP traffic as it is closer to an edge data center where application instances have just been launched. In yet another case, the N6 interfacing UPF may be changed to another UPF that is better able to handle (e.g., with lower latency) UP traffic of some applications as it is closer to an edge data centre where some of the applications are instantiated, whereas other applications keep utilizing the initial N6 interfacing UPF.

FIG. 1 illustrates an example multi-homed MA PDU session, according to certain example embodiments. In particular, FIG. 1 illustrates a multi-homed MA PDU session where initially, Initial AN1 and AN2 were leveraged, and there was a single UPF (e.g., ATSSS UPF1 or a UPF that supports ATSSS functionality). Then, due to UE mobility and the need for optimal routing of traffic via another UPF that supports ATSSS functionality (for reduced e2e latency), more than one UPF that supports ATSSS functionality and BP UPFs were introduced for the most optimal handling of the UP traffic. Although there may be multiple UPF that supports ATSSS functionality and BP UPFs, according to certain embodiments, there may be just one BP interfacing with all access networks.

Certain example embodiments may allow MA PDU session to support more than one UPF with ATSSS functionality. For instance, the MA PDU session may support ATSSS-lower layer (ATSSS-LL) or multipath transmission control protocol (MPTCP), or new steering functions such as quick UDP internet connection (QUIC) or multipath QUIC (MPQUIC) at the same time. According to some example embodiments, the UPFs with ATSSS functionality may be called ATSSS UPFs.

In certain example embodiments, a session management function (SMF) may update the UE by providing relevant ATSSS rules. The UE may also be provided with more than one IPv6 prefixes or addresses, and the IPv6 prefixes or addresses may be associated with different traffic filters, thereby also being associated with different ATSSS UPFs from the network perspective. The traffic filters may be indicative of (e.g., used to differentiate) different applications. In other words, different applications that refer to different traffic filters may be linked to different IPv6 addresses or prefixes allocated by the network to the UE. As such, a UE functionality is used in order to manage the IPv6 prefixes based on different traffic filters. Thus, different IPv6 prefixes may be used by the UE for subsequent uplink traffic routing considering the traffic filters received from the network. Additionally, traffic filters may include IP addresses, port numbers, and protocol information (5-tuple) to differentiate between applications. Further, traffic filters may tell, for example, for traffic targeting destination IP address/prefix, which range x . . . Y and port within range a . . . B the UE shall use source prefix 1, while for other types of traffic, source IP prefix 2 should be used. In some example embodiments, multi-homing may be transiently or permanently leveraged to support this functionality. A new UE functionality is needed for the UE to associate each IPV6 prefix it has been allocated by the network with ATSSS configuration information received from the network such as MPTCP (or QUIC/MPQUIC) proxy (addressing) information, the additional IP addresses/prefixes, called "link-specific multipath" addresses to be used by the UE to reach the proxy and the Measurement Assistance Information (information used to run Performance Measurements between the UE and the network).

According to certain example embodiments, branching traffic may be allowed to various ATSSS UPFs via IPv6 multi-homing According to other example embodiments, an MA PDU session may be allowed to support potentially multiple UPFs with branching point (BP) functionality. In some example embodiments, UPFs with BP functionality may be collocated with ATSSS UPFs. However, no matter how many UPFs with BP functionality there are in a MA PDU session, there may be just one UPF with BP functionality that interfaces with the respective access networks.

In certain example embodiments, if a MA PDU session leverages 5G RAN and untrusted non-3GPP as access networks, there may be several UPFs with BP functionality. However, in such a case, there may be just a single UPF with BP functionality that interfaces both access types. In some example embodiments, if ATSSS is allowed to leverage more than one 3GPP access and/or more than one non-3GPP access, then multiple UPFs with BP functionality may exist. However, in such a case, just a single UPF with BP functionality may interface with all accesses. In doing so, it may be possible to achieve proper charging and quality of service (QoS) handling. For example, session aggregated maximum bit rate (AMBR) may be enforced at the UPF with BP functionality interfacing the accesses.

Figure 2:
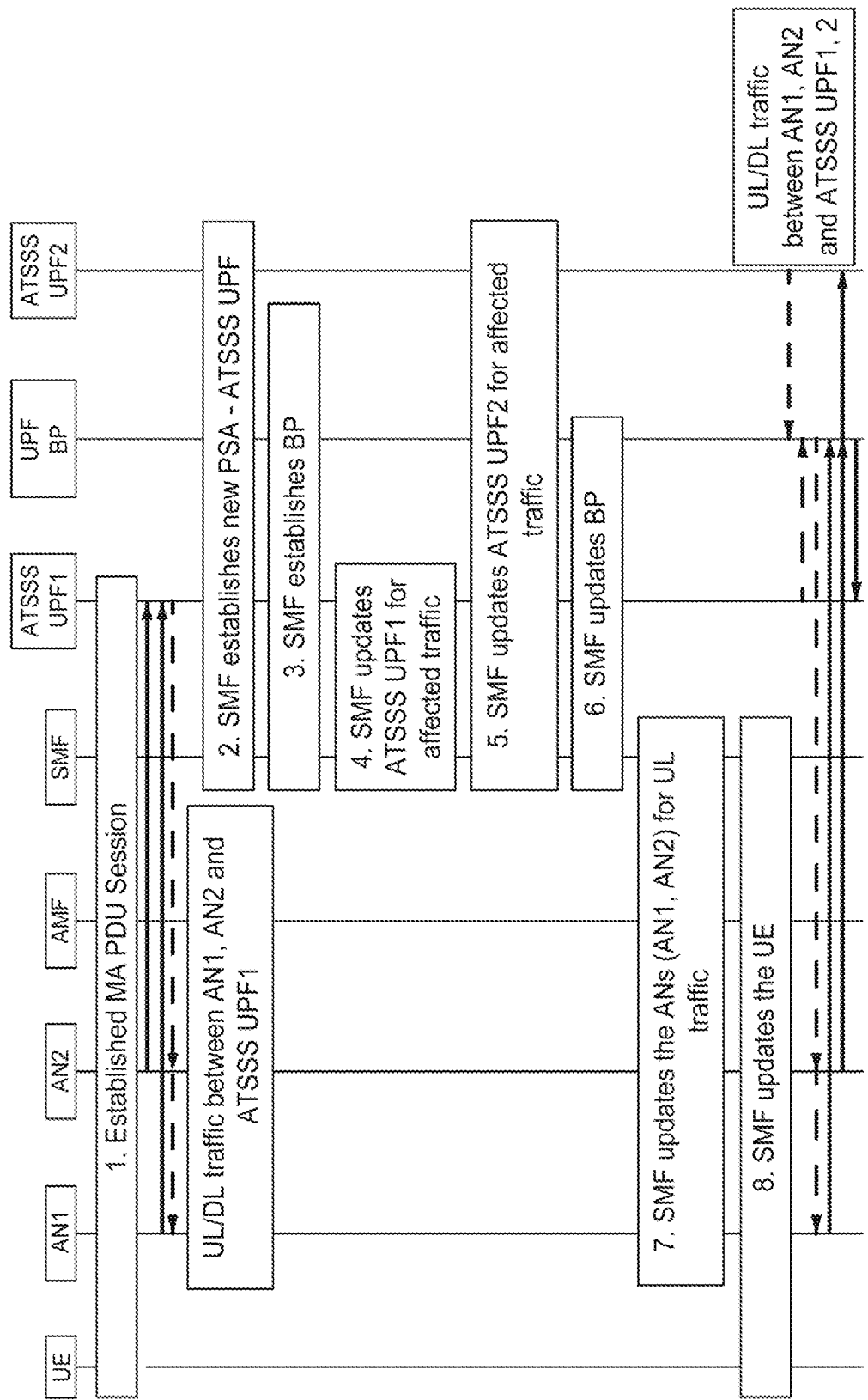
FIG. 2 illustrates an example signal flow diagram of a procedure for the addition of an access traffic steering, switching, and splitting (ATSSS) user plane function (UPF) and a branching point (BP) UPF, according to certain example embodiments.

FIG. 2 illustrates an example signal flow diagram of a procedure for the addition of a UPF with ATSSS functionality (e.g., ATSSS UPF) and a BP UPF, according to certain example embodiments. In particular, the example signal flow diagram of FIG. 2 illustrates how an additional ATSSS UPF and a UPF with BP functionality can be added to serve an existing MA PDU session, according to an embodiment. As illustrated in FIG. 2, at 1, the UE may have established an MA PDU session of IP type leveraging IPv6. At 2, the SMF may, decide, based on already specified triggers (e.g., due to UE mobility or new flow detection) that the existing ATSSS UPF is suboptimal (e.g. because another ATSSS UPF with N6 support may be selected to reach an application instance closer to the UE). For instance, the ATSSS UPF may be determined to be suboptimal at least for some application traffic (not for all traffic) considering the UE's current location. Thus, another UPF may need to be selected. This may trigger the SMF to select and establish, via the N4 interface, a new PDU session anchor (PSA) ATSSS UPF (ATSSS UPF2) for the MA PDU session. According to certain example embodiments, the decision may not be applicable to all the traffic for a given PDU session of the UE, but to parts of it. This may trigger the SMF to select and establish, via the N4 interface, a new PDU session anchor (PSA) ATSSS UPF (ATSSS UPF2) for the PDU session.

At 3, the SMF may select and establish (via N4) a BP UPF. According to certain example embodiments, the BP UPF illustrated in FIG. 2 is the only one for the MA PDU session. This implies that it must interface with both (or potentially more than two in the future) accesses, and the whole uplink/downlink (UL/DL) traffic of the UE must pass through it. According to other example embodiments, more than one BP UPF may exist. However, as described above, in this case, for example, there may be a single BP UPF interfacing with all access legs that are part of the MA PDU session. This may be useful for enabling proper QoS enforcement and charging as the BP UPF interfacing the accesses may have a full view of all flows of the MA PDU session, and may be able to enforce maximum bit rate (MBR) and perform charging.

At 4, the SMF may update UPF1 (e.g., a ATSSS UPF1 that can support ATSSS functionality) for the affected traffic. For example, the SMF may provide rules specifying which and how traffic should be handled in UPF1 that is subject to migration to the new UPF2 (e.g., a ATSSS UPF2 that can support ATSSS functionality). Thus, according to certain example embodiments, it may be possible to allow applications belonging to the same QoS flow to be handled differently. For instance, in some example embodiments, APP1 related traffic may be subject to ATSSS at ATSSS UPF1, while APP2 related traffic may be subject to ATSSS at ATSSS UPF2. According to certain example embodiments, the QoS flow may be assumed to be served by ATSSS UPF1 and UPF2 while there is a single BP for the QoS flow to ensure a single point for QoS enforcement and charging. Additionally, there may be no need to migrate all the traffic for the PDU session of the UE to ATSSS UPF2 as, for example, only APP2 related traffic is considered suboptimal for ATSSS UPF1, whereas ATS SS UPF2 is considered suboptimal for APP1 related traffic.

At 5, the SMF may update ATSSS UPF2 for the affected traffic. For instance, according to certain example embodiments, the SMF may provide rules specifying which and how traffic should be handled in UPF2 that is subject to migration to the ATSSS UPF2. From that point onwards, respective DL traffic may be distributed by ATSSS UPF1 and ATSSS UPF2 to the different access legs via the BP UPF based on the rules provided to UPF1 and UPF2.

At 6, the SMF may update BP UPF via the N4 interface. According to certain example embodiments, the update may include updating traffic forwarding rules. At 7, the SMF may update access network 1 (AN1) and access network 2 (AN2) via AMF for UL traffic from the UE to UPF, which may be forwarded to the single BP UPF interfacing the accesses of the MA PDU session. The SMF may include a N2SM container which is inserted within an NGAP message and sent to AN1/AN2 accordingly. In certain example embodiments, update of access networks may be needed if a BP UPF is inserted (or changed) that inter-connects with all access networks at the same time.

At 8, the SMF may update the UE by providing relevant ATSSS rules. The rules may refer to rules provided to the UE and the policies that the UE must use for establishing new MA PDU sessions and routing UL traffic. In addition, the UE may be provided with more than one IPv6 prefix or address, and the IPv6 prefixes or addresses may be associated with different traffic filters. Furthermore, different applications that refer to different traffic filters may be linked to different IPv6 addresses or prefixes. In certain example embodiments, the SMF may provide (over NAS) the UE with information associating each IPV6 prefix it allocated by the network with ATSSS configuration information such as MPTCP (or QUIC/MPQUIC) proxy (addressing) information, the additional IP addresses/prefixes, called "link-specific multipath" addresses to be used by the UE to reach the proxy and the Measurement Assistance Information (information used to run Performance Measurements between the UE and the network).

In certain example embodiments, multi-homing may be transiently or permanently leveraged to support this functionality. Thus, according to certain example embodiments, to support the multiple ATSSS UPFs and MPTCP proxies (and possibly other kinds of proxies such as QUIC/MPQUIC proxies in the future), the existing ATSSS container may need to be extended to indicate a matching of an MPTCP proxy information and the corresponding filter of an ATSSS rule. In certain example embodiments, this matching may be implemented by adding the ATSSS rule ID to the proxy element. The updated ATSSS rules may be delivered via NAS signaling such as PDU session establishment accept or PDU session modification command, and the UE may be updated to identify the matching information and use it accordingly. According to further example embodiments, an ATSSS UPF and potentially a BP UPF may be removed from the MA PDU session if they are no longer used, and/or may be removed when triggered by an application function (AF) via a network exposure function (NEF).

Figure 3:
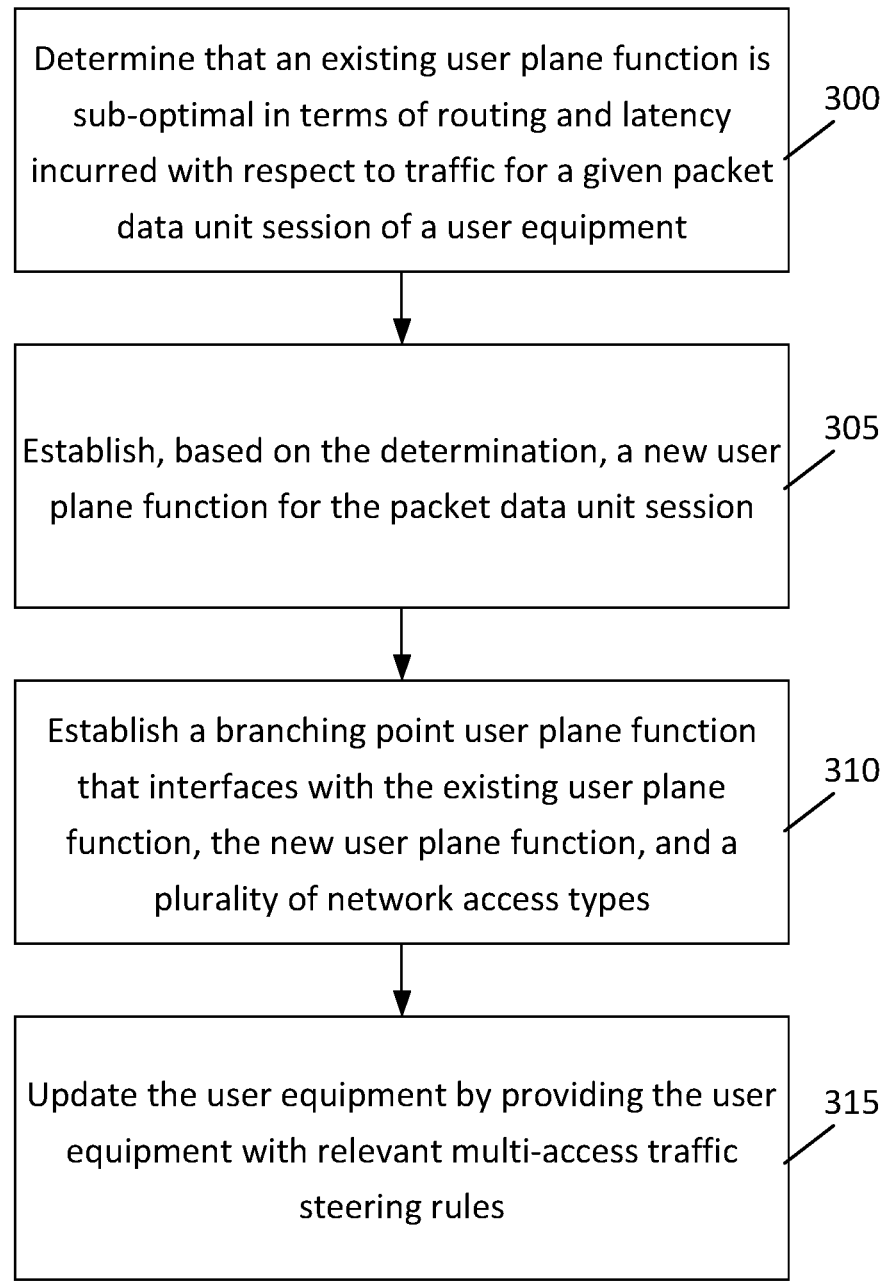
FIG. 3 illustrates an example flow diagram of a method, according to certain example embodiments.

FIG. 3 illustrates an example flow of a method, according to certain example embodiments. In an example embodiment, the method of FIG. 3 may be performed by a network entity, or a group of multiple network elements in a 3GPP system, such as LTE or 5G-NR. For instance, in an example embodiment, the method of FIG. 3 may be performed by an SMF that may be similar to one of apparatuses 10 or 20 illustrated in FIG. 5.

According to certain example embodiments, the method of FIG. 3 may include, at 300, determining that an existing user plane function is sub-optimal in terms of routing and latency incurred with respect to traffic for a given packet data unit session of a user equipment. The method may also include, at 305, establishing, based on the determination, a new user plane function for the packet data unit session. The method may further include, at 310, establishing a branching point user plane function that interfaces with the existing user plane function, the new user plane function, and a plurality of network access types. In general, more than one UPF with BP functionality may finally exist. According to certain example embodiments, one UPF with BP functionality may interface with all access networks. However, in other example embodiments, this UPF may or may not interface with all multi-access UPFs. In addition, the method may include, at 315, updating the user equipment by providing the user equipment with relevant multi-access traffic steering rules.

According to certain example embodiments, the method may further include updating the existing user plane function and the new user plane function for the affected traffic. According to some example embodiments, the method may also include updating, via an N4 interface, the branching point user plane function with traffic forwarding rules for uplink and downlink traffic. According to other example embodiments, the method may also include updating a plurality of access networks for uplink traffic that is forwarded to the branching part user plane function interfacing the plurality of network access types.

In certain example embodiments, the method may further include provisioning, to the user equipment, updated multi-access traffic steering rules for a multi-access traffic steering user plane function. In some example embodiments, the update may be provisioned adding a multi-access traffic steering rule identifier to a protocol proxy. In other example embodiments, the method may also include providing the user equipment with a plurality of internet protocol version 6 prefixes or addresses associated with different ATSSS configuration information such as at least one of MPTCP (or QUIC/MPQUIC) proxy (addressing) information, and of additional IP addresses/prefixes, called "link-specific multipath" addresses to be used by the UE to reach the proxy and of Measurement Assistance Information (information used to run Performance Measurements between the UE and the network).

Figure 4:
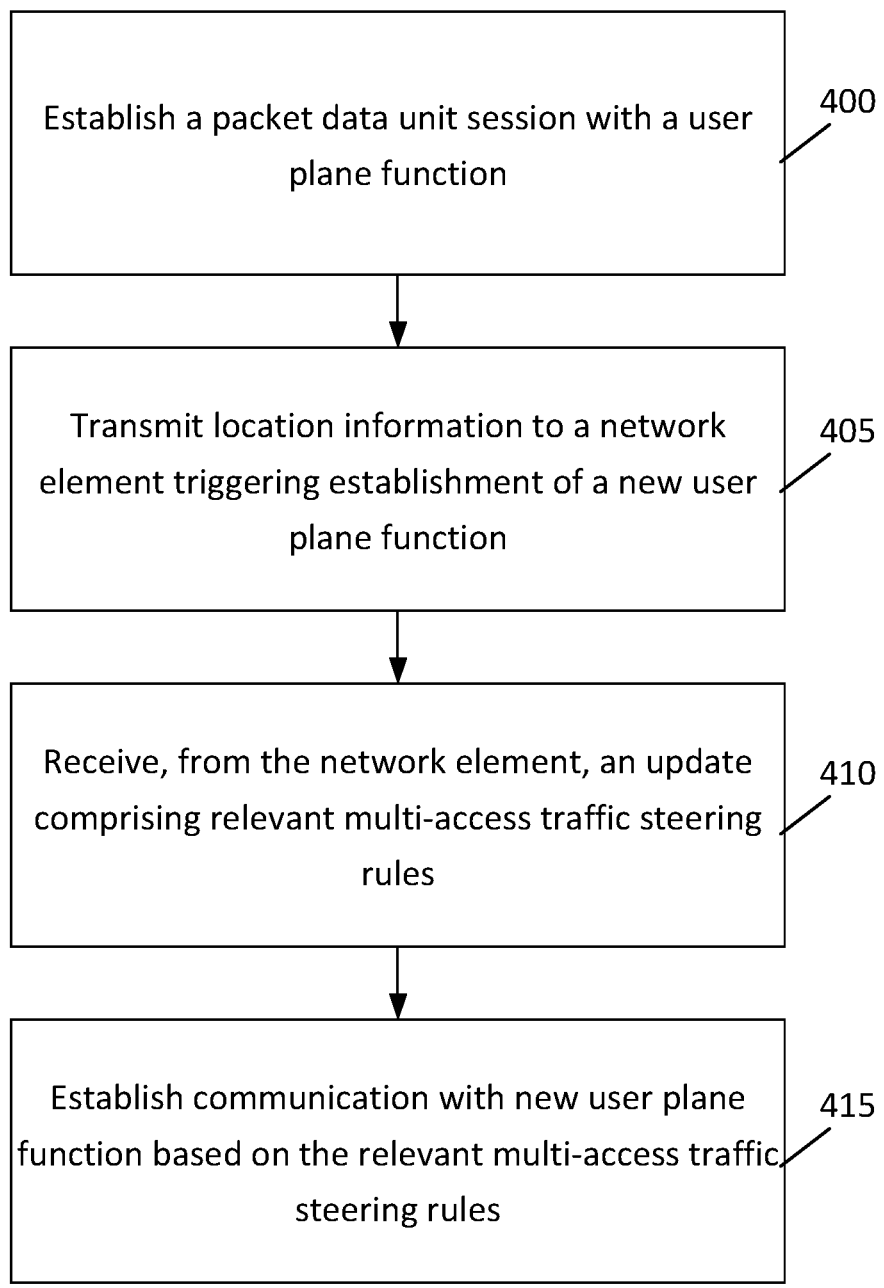
FIG. 4 illustrates an example flow diagram of another method, according to certain example embodiments.

FIG. 4 illustrates an example flow of another method, according to certain example embodiments. In certain example embodiments, the method of FIG. 4 may be performed by a network entity, or a group of multiple network elements in a 3GPP system, such as LTE or 5G-NR. For instance, in an example embodiment, the method of FIG. 4 may be performed by a UE that may be similar to one of apparatuses 10 or 20 illustrated in FIG. 5.

According to certain example embodiments, the method of FIG. 4 may include, at 400, establishing a packet data unit session with a user plane function. The method may also include, at 405, transmitting location information to a network element triggering establishment of a new user plane function. The method may further include, at 410, receiving, from the network element, an update comprising relevant multi-access traffic steering rules. In addition, the method may include, at 415, establishing communication with new user plane function based on the relevant multi-access traffic steering rules.

According to certain example embodiments, the method may also include routing uplink traffic to the new user plane function based on the relevant multi-access traffic steering rules. According to some example embodiments, the method may further include receiving updated multi-access traffic steering rules for a multi-access traffic steering user plane function. In certain example embodiments, the update may be received with a multi-access traffic steering rule identifier and additional information of a protocol proxy. According to other example embodiments, the method may include processing the updated multi-access rules. Further, in certain example embodiments, the method may include receiving internet protocol routing information (e.g., a plurality of internet protocol version 6 prefixes or addresses) associated with different traffic filters. Additionally, in some example embodiments, the method may include performing subsequent uplink traffic routing by using internet protocol routing information (e.g., the plurality of internet protocol version 6 prefixes or addresses) considering the different traffic filters.

Figure 5:
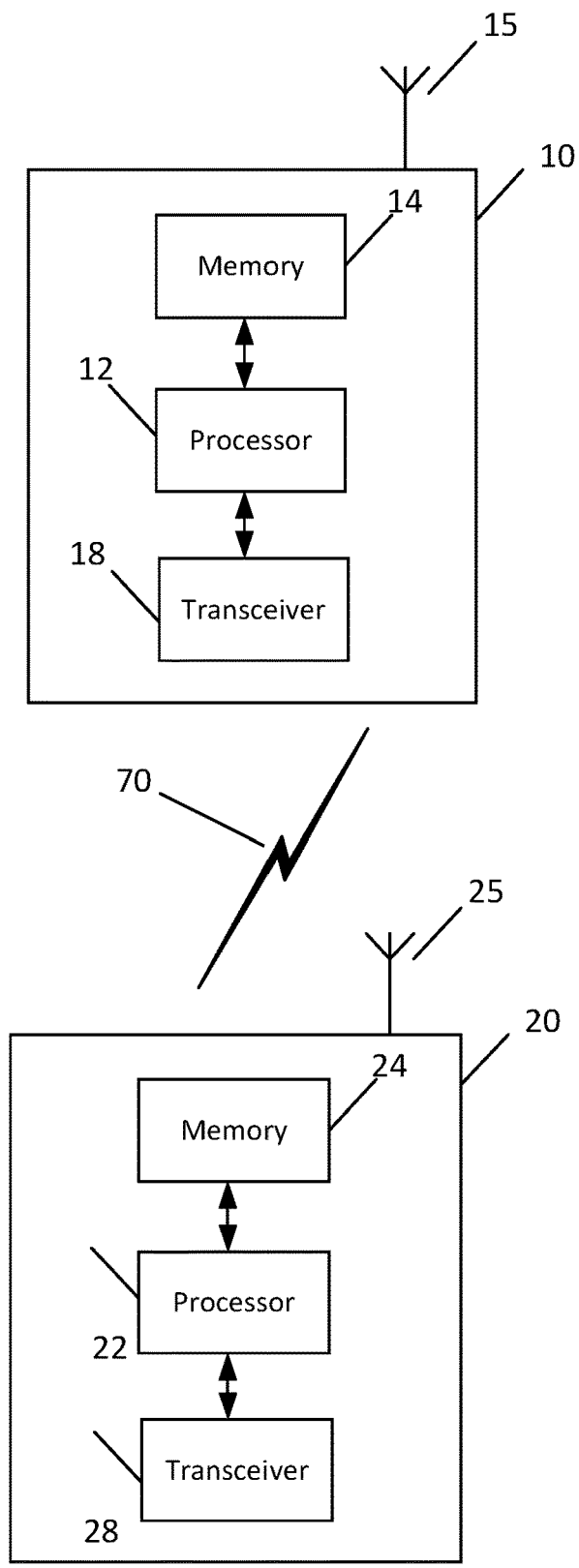
FIG. 5 illustrates a set of apparatuses, according to certain example embodiments.

According to certain example embodiments, an internet protocol routing information subset (e.g., an internet protocol version 6 prefix or address) from among the internet protocol routing information (e.g., the plurality of internet protocol version 6 prefixes or addresses) may be associated with an application via a respective traffic filter of the different traffic filters. According to other example embodiments, an internet protocol routing information subset (e.g., an internet protocol version 6 prefix or address) from among the internet protocol routing information (e.g., the plurality of internet protocol version 6 prefixes or addresses) may be associated with an ATSSS UPF via a respective traffic filter of the different traffic filters. In certain example embodiments, the method may also include determining, for the subsequent uplink traffic routing, the internet protocol routing information subset (e.g., an internet protocol version 6 prefix or address) from among the internet protocol routing information (e.g., the plurality of internet protocol version 6 prefixes or addresses), considering the respective traffic filter associated with the application. In some example embodiments, the subsequent uplink traffic routing may be transiently supported by multihoming In other example embodiments, the subsequent uplink traffic routing may be permanently supported by multihoming FIG. 5 illustrates a set of apparatuses 10 and 20, according to certain example embodiments. In certain example embodiments, apparatus 10 may be a node or element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 5.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 5.

As illustrated in the example of FIG. 5, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1, 2, and 4.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1, 2, and 4.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

In certain example embodiments, apparatus 10 may be controlled by memory 14 and processor 12 to establish a packet data unit session with a user plane function. Apparatus 10 may also be controlled by memory 14 and processor 12 to transmit location information to a network element triggering establishment of a new user plane function. Apparatus 10 may further be controlled by memory 14 and processor 12 to receive, from the network element, an update comprising relevant multi-access traffic steering rules. In addition, apparatus 10 may be controlled by memory 14 and processor 12 to establish communication with new user plane function based on the relevant multi-access traffic steering rules.

As illustrated in FIG. 5, apparatus 20 may be a node or element in a communications network or associated with such a network, such as a base station, a Node B, an evolved Node B (eNB), 5G Node B or access point, next generation Node B (NG-NB or gNB), SMF, UPF, and/or WLAN access point, associated with a radio access network (RAN), such as an LTE network, 5G or NR. It should be noted that one of ordinary skill in the art would understand that apparatus 20 may include components or features not shown in FIG. 5.

As illustrated in the example of FIG. 5, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-3.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-3.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In certain example embodiments, apparatus 20 may be controlled by memory 24 and processor 22 to determine that an existing user plane function is sub-optimal in terms of routing and latency incurred with respect to traffic for a given packet data unit session of a user equipment. Apparatus 20 may also be controlled by memory 24 and processor 22 to establish, based on the determination, a new user plane function for the packet data unit session. Apparatus 20 may further be controlled by memory 24 and processor 22 to establish a branching point user plane function that interfaces with the existing user plane function, the new user plane function, and a plurality of network access types. In addition, apparatus 20 may be controlled by memory 24 and processor 22 to update the user equipment by providing the user equipment with relevant multi-access traffic steering rules.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may further be directed to an apparatus that includes means for performing any of the methods described herein including, for example, means for establishing a packet data unit session with a user plane function. The apparatus may also include means for transmitting location information to a network element triggering establishment of a new user plane function. The apparatus may further include means for receiving, from the network element, an update comprising relevant multi-access traffic steering rules. In addition, the apparatus may include means for establishing communication with new user plane function based on the relevant multi-access traffic steering rules.

Certain example embodiments may further be directed to an apparatus that includes means for performing any of the methods described herein including, for example, means for determining that an existing user plane function is sub-optimal in terms of routing and latency incurred with respect to traffic for a given packet data unit session of a user equipment. The apparatus may also include means for establishing, based on the determination, a new user plane function for the packet data unit session. The apparatus may further include means for establishing a branching point user plane function that interfaces with the existing user plane function, the new user plane function, and a plurality of network access types. In addition, the apparatus may include means for updating the user equipment by providing the user equipment with relevant multi-access traffic steering rules.

Certain example embodiments described herein provide several technical improvements, enhancements, and/or advantages. Some example embodiments may enable the following use cases and provide optimized routing, and better end user experience: Changing the N6 interfacing UPF to another UPF able to handle better (e.g., with lower latency) UP traffic as it is closer to the moving UE using latency sensitive applications (e.g., applications that require low latency); changing the N6 interfacing UPF to another UPF able to handle better (e.g., with lower latency) UP traffic as it is closer to an edge data center where application instances have just been launched; and partially changing the N6 interfacing UPF to another UPF able to handle better (e.g., with lower latency) UP traffic of some applications as it is closer to an edge data center where some of the applications are instantiated that use the MA PDU session.

In some example embodiments, it may be possible to allow an MA PDU session to support more than one UPF with ATSSS functionality, and support ATSSS-LL or MPTCP or new steering functions such as QUIC or MPQUIC. Certain example embodiments may also allow an MA PDU session to support potentially multiple UPFs with BP functionality. Additionally, certain example embodiments may provide proper charging and QoS handling as the BP UPF interfacing the accesses has full view of all flows of the MA PDU session, and may be able to enforce MBR and perform charging.

According to further example embodiments, it may be possible to allow applications belonging to the same QoS flow to be handled differently. Furthermore, with certain example embodiments, there may be no need to migrate all the traffic for the PDU session of the UE to ATSSS UPF2.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on processing power (e.g., available processing power and/or needed processing power), the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3rd Generation Partnership Project
5G 5th Generation
5GCN 5G Core Network
5GS 5G System
AF Application Function
AMBR Aggregated Maximum Bit Rate
AMF Access and Mobility Management Function
AN Access Network
App Application
ATSSS Access Traffic Steering, Switching, and Splitting
ATSSS-LL ATSSS Lower Layer
BP Branching Point
BS Base Station
DL Downlink
DN Data Network
DNN Data Network Name
eNB Enhanced Node B
FAR Forwarding Action Rule
gNB 5G or Next Generation NodeB
LTE Long Term Evolution
MAR Multi Access Rules
MBR Maximum Bit Rate
MPQUIC Multipath QUIC
MPTCP Multipath TCP
NAS Non Access Stratum
NEF Network Exposure Function
NR New Radio
PCF Policy Control Function
PDU Packet Data Unit
PMF Performance Measurement Functionality
PSA PDU Session Anchor
QoS Quality of Service
SM Session Management
SSC Session and Service Continuity
UDM Unified Data Management
UE User Equipment
UL Uplink
UPF User Plane Function

We claim:
1. An apparatus, comprising:
at least one processor; and
at least one memory comprising computer program code,
the at least one memory and the computer program code are configured, with the at least one processor, to cause the apparatus at least to determine that an existing user plane function is suboptimal in terms of routing and latency incurred with respect to traffic for a given packet data unit session of a user equipment;

establish, based on the determination, a new user plane function for the packet data unit session;

establish a branching point user plane function that interfaces with the existing user plane function, the new user plane function, and a plurality of network access types; and update the user equipment by providing the user equipment with relevant multi-access traffic steering rules.

2. The apparatus according to claim 1, wherein the at least one memory and the computer program code are further configured, with the at least one processor, to cause the apparatus at least to:

update the existing user plane function and the new user plane function for the affected traffic.

3. The apparatus according to claim 1, wherein the at least one memory and the computer program code are further configured, with the at least one processor, to cause the apparatus at least to:

update, via an N4 interface, the branching point user plane function with traffic forwarding rules for uplink and downlink traffic.

4. The apparatus according to claim 1, wherein the at least one memory and the computer program code are further configured, with the at least one processor, to cause the apparatus at least to:

update a plurality of access networks for uplink traffic that is forwarded to the branching part user plane function interfacing the plurality of network access types.

5. The apparatus according to claim 1, wherein the at least one memory and the computer program code are further configured, with the at least one processor, to cause the apparatus at least to:

provision, to the user equipment, updated multi-access traffic steering rules for a multi-access traffic steering user plane function, wherein the update is provisioned by adding a multi-access traffic steering rule identifier to a protocol proxy.

6. The apparatus according to claim 1, wherein the at least one memory and the computer program code are further configured, with the at least one processor, to cause the apparatus at least to:

provide the user equipment with a plurality of internet protocol version 6 prefixes or addresses.

7. An apparatus, comprising:
at least one processor; and
at least one memory comprising computer program code, the at least one memory and the computer program code are configured, with the at least one processor, to cause the apparatus at least to establish a packet data unit session with a user plane function;

transmit location information to a network element triggering establishment of a new user plane function;

receive, from the network element, an update comprising relevant multi-access traffic steering rules; and establish communication with the new user plane function based on the relevant multi-access traffic steering rules.

8. The apparatus according to claim 7, wherein the at least one memory and the computer program code are configured, with the at least one processor, to cause the apparatus at least to:

route uplink traffic to the new user plane function based on the relevant multi-access traffic steering rules.

9. The apparatus according to claim 7, wherein the at least one memory and the computer program code are further configured, with the at least one processor, to cause the apparatus at least to:

receive updated multi-access traffic steering rules for a multi-access traffic steering user plane function, wherein the update is received with a multi-access traffic steering rule identifier and additional information of a protocol proxy; and process the updated multi-access rules.

10. The apparatus according to claim 7, wherein the at least one memory and the computer program code are further configured, with the at least one processor, to cause the apparatus at least to:

receive internet protocol routing information associated with different traffic filters; and perform subsequent uplink traffic routing by using the internet protocol routing information considering the different traffic filters.

11. The apparatus according to claim 10, wherein an internet protocol routing information subset from the internet protocol routing information is associated with an application via a respective traffic filter of the different traffic filters.

12. The apparatus according to claim 11, wherein the at least one memory and the computer program code are further configured, with the at least one processor, to cause the apparatus at least to:

determine, for the subsequent uplink traffic routing, the internet protocol subset from the internet protocol routing information considering the respective traffic filter associated with the application.

13. A method, comprising:

determining that an existing user plane function is suboptimal in terms of routing and latency incurred with respect to traffic for a given packet data unit session of a user equipment;

establishing, based on the determination, a new user plane function for the packet data unit session;

establishing a branching point user plane function that interfaces with the existing user plane function, the new user plane function, and a plurality of network access types; and updating the user equipment by providing the user equipment with relevant multi-access traffic steering rules.

14. The method according to claim 13, further comprising:

updating the existing user plane function and the new user plane function for the affected traffic.

15. The method according to claim 13, further comprising:

updating, via an N4 interface, the branching point user plane function with traffic forwarding rules for uplink and downlink traffic.

16. The method according to claim 13, further comprising:

updating a plurality of access networks for uplink traffic that is forwarded to the branching part user plane function interfacing the plurality of network access types.

17. The method according to claim 13, further comprising:

provisioning, to the user equipment, updated multi-access traffic steering rules for a multi-access traffic steering user plane function, wherein the update is provisioned by adding a multi-access traffic steering rule identifier to a protocol proxy.

18. A method, comprising:
   establishing a packet data unit session with a user plane function;
   transmitting location information to a network element triggering establishment of a new user plane function;
   receiving, from the network element, an update comprising relevant multi-access traffic steering rules; and
   establishing communication with the new user plane function based on the relevant multi-access traffic steering rules.

19. The method according to claim 18, further comprising:
   routing uplink traffic to the new user plane function based on the relevant multi-access traffic steering rules.

20. The method according to claim 18, further comprising:
   receiving updated multi-access traffic steering rules for a multi-access traffic steering user plane function, wherein the update is received with a multi-access traffic steering rule identifier and additional information of a protocol proxy; and
   processing the updated multi-access rules.

21. The method according to claim 18, further comprising:
   receiving internet protocol routing information associated with different traffic filters; and
   performing subsequent uplink traffic routing by using the internet protocol routing information considering the different traffic filters.

22. The method according to claim 21,
   wherein an internet protocol routing information subset from the internet protocol routing information is associated with an application via a respective traffic filter of the different traffic filters.

23. The method according to claim 22, further comprising:
   determining, for the subsequent uplink traffic routing, the internet protocol routing information subset from the internet protocol routing information, considering the respective traffic filter associated with the application.

* * * * *